United States Patent
Bremer

(10) Patent No.: US 11,249,006 B2
(45) Date of Patent: Feb. 15, 2022

(54) DEVICE AND METHOD FOR INVESTIGATING BULK MATERIAL

(71) Applicant: Sikora AG, Bremen (DE)

(72) Inventor: Klaus Bremer, Grasberg (DE)

(73) Assignee: SIKORA AG, Bremen (DE)

( * ) Notice: Subject to any disclaimer, the term of this patent is extended or adjusted under 35 U.S.C. 154(b) by 356 days.

(21) Appl. No.: 16/303,815

(22) PCT Filed: May 24, 2017

(86) PCT No.: PCT/EP2017/062615
§ 371 (c)(1),
(2) Date: Nov. 21, 2018

(87) PCT Pub. No.: WO2017/202954
PCT Pub. Date: Nov. 30, 2017

(65) Prior Publication Data
US 2020/0300748 A1     Sep. 24, 2020

(30) Foreign Application Priority Data
May 26, 2016 (DE) .......................... 102016109752.7

(51) Int. Cl.
*G01N 15/14*     (2006.01)
*G01N 21/85*     (2006.01)
*G01N 21/88*     (2006.01)

(52) U.S. Cl.
CPC ......... *G01N 15/1434* (2013.01); *G01N 21/85* (2013.01); *G01N 21/8806* (2013.01);
(Continued)

(58) Field of Classification Search
None
See application file for complete search history.

(56) References Cited

U.S. PATENT DOCUMENTS 4,350,442 A * 9/1982 Arild .................. B07C 5/3425
                                                                                                 209/577
4,976,356 A    12/1990 Mizuno et al.
(Continued)

FOREIGN PATENT DOCUMENTS

AU        683969 B2    8/1996
DE       2722368 A1    5/1977
(Continued)

OTHER PUBLICATIONS

JP Application No. 2018-556341; Filed May 24, 2017; Japanese Office Action dated Jun. 11, 2020 (4 pages).
(Continued)

*Primary Examiner* — Rufus L Phillips
(74) *Attorney, Agent, or Firm* — Barclay Damon LLP

(57) ABSTRACT

A device and method for reliably and accurately detecting impurities in a bulk material comprising two opposing tunnel sections arranged such that a bulk material stream flows between or through the tunnel sections. At least one of the tunnel sections has a lighting means configured for indirectly illuminating the bulk material stream. Furthermore, an optical detector receives the light emitted from the illuminated bulk material. The lighting means and optical detector are configured about the tunnel sections such that the optical radiation optical radiation does not pass directly from the lighting means to the bulk material, nor from the bulk material stream to the optical detector An evaluation apparatus, responsive to measured data from the optical detector, identifies impurities in the bulk material. The invention moreover relates to a method for operating such a device.

17 Claims, 3 Drawing Sheets

(52) U.S. Cl.
CPC ................ *G01N 2021/8592* (2013.01); *G01N 2021/8812* (2013.01)

(56) References Cited

U.S. PATENT DOCUMENTS

| | | | |
|---|---|---|---|
| 5,638,961 A * | 6/1997 | Satake .................. | B07C 5/3425 209/580 |
| 5,650,843 A * | 7/1997 | Moberg ............. | H04N 1/02815 250/205 |
| 6,078,018 A | 6/2000 | Davis et al. | |
| 6,570,177 B1 * | 5/2003 | Struckhoff ........... | G01N 15/147 250/222.1 |
| 8,373,081 B2 | 2/2013 | Ackley et al. | |
| 8,985,342 B2 | 3/2015 | Tanaka | |
| 9,677,988 B1 * | 6/2017 | Doggett ................. | G01N 15/06 |
| 2009/0079970 A1 | 3/2009 | Cohn et al. | |
| 2015/0355083 A1 * | 12/2015 | Marbach ............... | B07C 5/3408 356/402 |

FOREIGN PATENT DOCUMENTS

| | | |
|---|---|---|
| DE | 102012001868 A1 | 7/2013 |
| EP | 0631828 A2 | 1/1995 |
| GB | 2165644 A | 4/1986 |
| JP | 4076414 A | 4/2004 |
| JP | 20077494 A | 1/2007 |
| JP | 2007283204 A | 11/2007 |
| JP | 2007330880 A | 12/2007 |
| JP | 200934645 A | 2/2009 |
| JP | 2011078922 A | 4/2011 |
| WO | 2015/051927 A1 | 4/2015 |

OTHER PUBLICATIONS

RU Application No. 2018144636/12(074490); Filed May 24, 2017; Russian Search Report dated Jul. 1, 2019 (2 pages).
RU Application No. 2018144636/12(074490); Filed May 24, 2017; Russian Office Action dated Jul. 3, 2019 (4 pages).
RU Application No. 2018144636/12(074490); Filed May 24, 2017; English Translation of Russian Office Action dated Jul. 3, 2019 (5 pages).
CN 201780029786; filed May 24, 2017; Office Action dated Sep. 16, 2021 (9 pages).

* cited by examiner

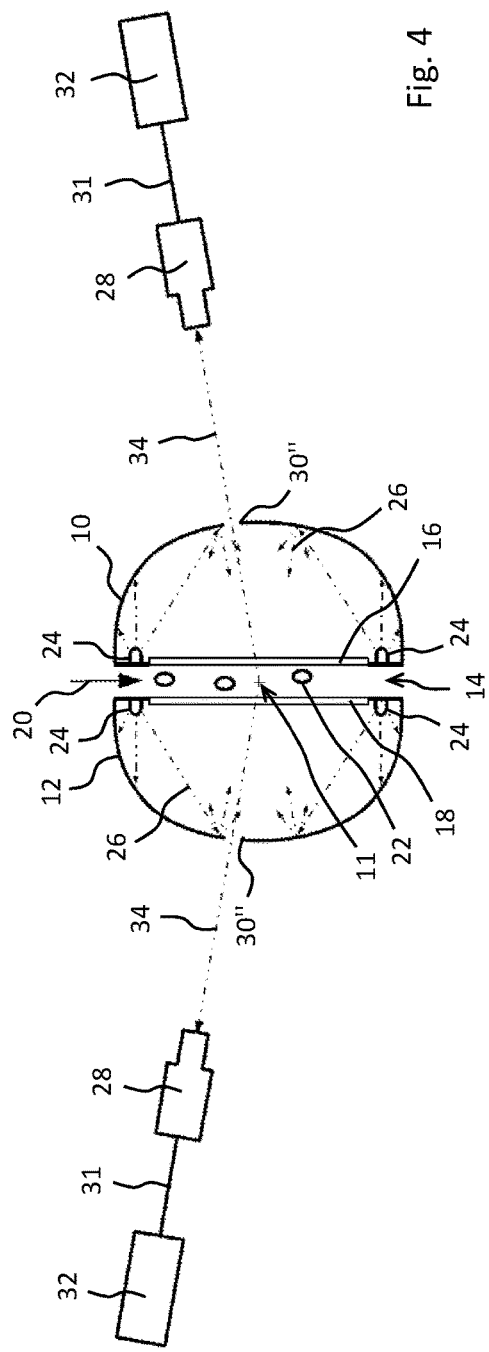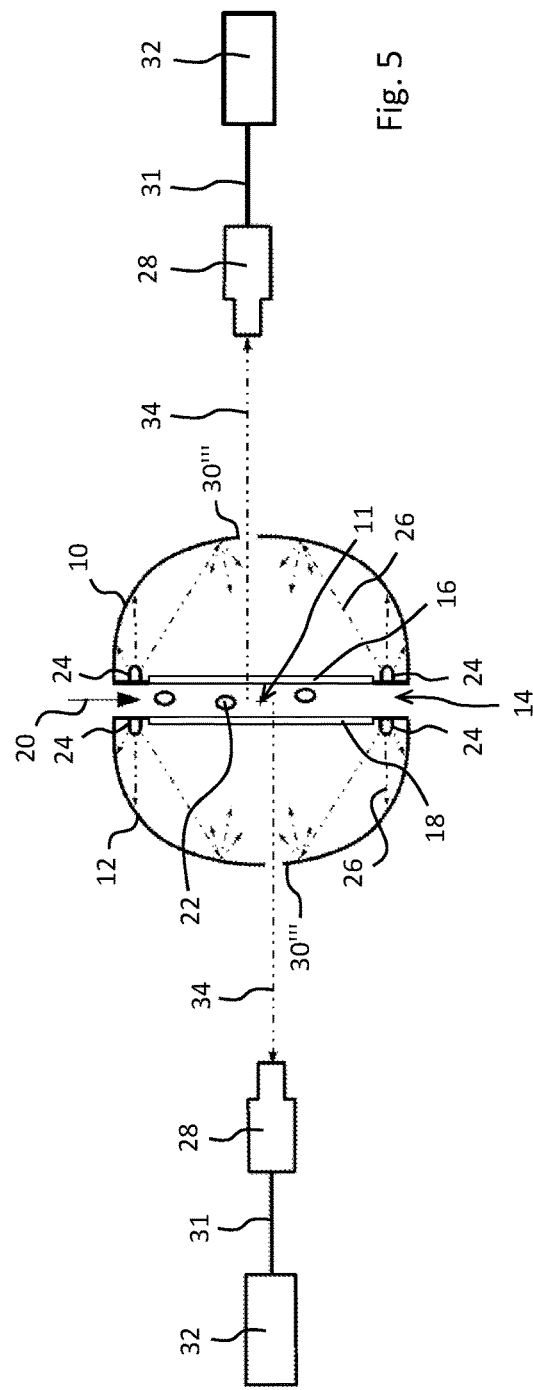

DEVICE AND METHOD FOR INVESTIGATING BULK MATERIAL

CROSS REFERENCE TO RELATED INVENTION

This application is a national stage application pursuant to 35 U.S.C. § 371 of International Application No. PCT/EP2017/062615, filed on May 24, 2017, which claims priority to, and benefit of, German Patent Application No. 10 2016 109 752.7, filed May 26, 2016, the entire contents of which are hereby incorporated by reference.

BACKGROUND

It is known to detect impurities in bulk material, such as plastic pellets, with the assistance of optical measuring methods. The pellets to be investigated are fed by a suitable supply, such as a vibrating delivery channel to an optical detector apparatus that investigates the pellets in a free fall. Such a device is, for example, known from WO 2015/051927 A1. The impurities can, for example, be metal impurities in plastic pellets which are supplied to an extruder as an output material for a plastic insulation of electrical conductors.

Depending on the type of bulk material to be investigated, the procedure yields a more-or-less effective detection of impurities. The known procedure is problematic, in particular for transparent pellets. Whereas transparent pellets with a rough surface are still investigated comparatively reliably due to a largely diffuse reaction of the light directed toward the pellets by an optical measuring apparatus, in particular transparent pellets with a smooth and mirror-reflective surface are problematic. In this case, problems arise due to reflections and shading. Detection is made even more difficult due to the fact that the pellets are falling, and their alignment is therefore randomly distributed.

A need, therefore, exists for a device and method to easily and reliably detect and remove impurities from bulk material.

BRIEF SUMMARY OF THE INVENTION

The invention relates to a device for investigating bulk material, in particular pellets, for impurities, comprising a bulk material inlet through which the bulk material is supplied in a substantially flat bulk material stream. The invention comprises opposing tunnel sections which are arranged such that the bulk material stream flows through the tunnel sections At least one of the tunnel sections has a lighting or illumination means for indirectly illuminating the bulk material stream. As such, optical radiation from the lighting means does not pass directly through the bulk material nor from the lighting means to an optical detector. At least one optical detector may be provided in at least one of the tunnel sections and directed toward the bulk material stream. The device, furthermore, includes an evaluation apparatus to identify impurities in the stream of bulk material using measured data from the at least one optical detector.

The bulk material can be pellets, such as plastic pellets. In particular, the bulk material can be transparent to the optical radiation emitted by the lighting means and received by the at least one optical detector, and/or to the human eye. The transparent pellets may include a smooth and mirror-reflective surface.

The device comprises a bulk material inlet through which the bulk material to be investigated is supplied. This bulk material inlet can, in the simplest case, be formed by the inlet into the tunnel sections. The bulk material supplied through the bulk material inlet may fall under gravity in a free, or laterally-guided fall through the device. A conveyor belt or a vibrating channel supplying the bulk material to the bulk material inlet can be upstream from the bulk material inlet as is known from WO 2015/051927 A1. By means of such supplies, a bulk material stream substantially in a plane can be reliably generated. The bulk material stream falls like a curtain through a tubular section formed by two tunnel sections. The falling direction of the bulk material stream in this case is in particular perpendicular to the longitudinal axis of the tubular section formed by the tunnel sections. After passing through the device, the essentially flat bulk material stream leaves the device through a bulk material outlet. The bulk material inlet and outlet form a (vertical) plane that coincides with the plane of symmetry of the dual tunnel formed by the combined tunnel sections.

According to the invention, the falling bulk material is illuminated indirectly through the tubular section formed by the tunnel sections. For this purpose, at least one of the tunnel sections has suitable lighting means. The indirect illumination of the bulk material stream is such that optical radiation does not pass directly from the lighting means to the bulk material. Furthermore, the optical radiation does not pass directly from the lighting means to the optical detector. At least one optical detector detects the indirectly illuminated bulk material stream. The at least one optical detector can, for example, be directed toward the bulk material stream in a direction transverse to the falling curtain of the bulk material. The optical detector that can, for example, be a camera that is sensitive to a wavelength emitted by the lighting means of the at least one tunnel section. The light emitted by the lighting means can lie within the visible or invisible light spectrum, i.e., wavelength range, such as the infrared or UV range. In one embodiment, the lighting means can be light emitted by light emitting diodes. Line scan cameras may be employed as optical detectors, as well as two-dimensionally resolving cameras. The at least one optical detector can also create quickly repeating images. It is also possible to use cameras operating as optical detectors in a TDI (time delay integration) mode. The measured data from the at least one optical detector is transmitted to an evaluation unit that deduces impurities in the bulk material. In this context, color deviations of the bulk material, i.e., from a threshold or given color, are also considered impurities. The evaluation apparatus can deduce impurities from an occurrence of detected radiation of a specific brightness. Such an evaluation is known in principle from WO 2015/051927 A1.

The disclosure recognizes that impurities t may be detected by illuminating the bulk material as evenly as possible from all spatial directions while falling. To achieve such illumination, the disclosed double tunnel is provided through which the bulk material stream falls. In this case, the invention uses the functionality of a so-called Ulbricht sphere, i.e., a hollow sphere that reflects diffusely on the inside with a light source arranged in the center of the sphere. Of course, the Ulbricht sphere is an idealized arrangement that cannot be applied in practice to a bulk material stream that is falling. On the one hand, a bulk material stream passing through an Ulbricht sphere disturbs the ideal sphere illumination. On the other hand, shadows from adjacent parts of the bulk material stream arise which also leads to erroneous detections. Moreover, for reasons of structural dimensions as well, the use of such an Ulbricht sphere is also impractical for a wide bulk material stream desired for a rapid or high bulk material throughput. Dome-shaped (incident light) illumination arrangements have also been proposed which cover and illuminate a specimen arranged on an underlay. In this case as well, transference to a bulk material stream that is falling is impossible. Furthermore, such an illumination arrangement generates shadows which cause erroneous detections. Underlays for bulk material that is immovably arranged, even transparent underlays, distorting the detection due to additional reflections. This concerns reflections in the region of contact between the bulk material and an underlay. Problem sites would arise that feign impurities that are actually not there.

The double tunnel arrangement with opposed tunnel-shaped sections, form a cylindrical tube section which project laterally beyond the width of the bulk material stream. The flat bulk material stream is optimally illuminated on all sides and is in particular investigated by the optical detector in the center of the dual or double tunnel arrangement. As such, the teachings of the disclosure effects reliable and accurate detection of impurities. Since the bulk material stream falls through the tunnel sections, interference from any underlays holding the bulk material is reliably avoided. As already explained, the bulk material can fall freely or guided through the device. A "guided fall" in this context is understood to be a more-or-less a free fall in which the objects can briefly graze e.g. adjacent side walls, whereby they are guided, on the one hand, in a relatively narrow region and, on the other hand, assume substantially the same speed as in a free fall.

The tunnel sections oppose each other, can be arranged symmetrically constructed identically. It is, however, also possible for the tunnel sections to be designed differently. For example, the tunnel sections can each be designed with a semicircular cross-section, i.e., each forming onehalf (semicircular) of a cylinder. They can, however, also possess a cross-sectional shape different from a semi-circular shape. For example, the tunnel sections can have varying radii, possess one or more flat parts, or comprise additional edges.

The tunnel sections can be spaced apart from each other, wherein the bulk material stream falls through a gap between the tunnel sections formed because of the spacing. The gap can be limited by discs in the tunnel sections that oppose each other and which are transparent to the light emitted by the lighting means. The transparent discs can also be arranged parallel to each other. They can protect the interior of the tunnel sections from impurities such as dust without impairing the efficacy of the optical detector. Moreover, they can support the guidance of the falling bulk material stream.

To achieve a particularly effective material stream, both tunnel sections can have lighting means for indirectly illuminating the bulk material stream. It is, however, also possible to passively operate one of the tunnel sections, i.e., the background lighting tunnel section facing away from the optical detector, without its own, dedicated, lighting means. The bulk material can then be indirectly illuminated due to the lighting means of the opposing tunnel section. In many cases, the homogeneity of the illumination of the bulk material and hence the detectability of impurities can be improved in this manner.

The lighting means for indirectly illuminating the bulk material stream can be arranged such that they illuminate an inner side of the at least one tunnel section diffusely reflecting the optical radiation emitted by the lighting means. The diffusely reflecting surface can, for example, be white and matte. The diffusely reflecting inner surface can be coated with diffusely reflecting material of differing thickness. The illumination of the bulk material stream, and the detection of impurities, may be further improved in this manner. Additional illumination arrangements may also be provided.

In this case, in particular both tunnel sections can be provided with such a diffusely reflecting surface that is illuminated by the lighting means. In another embodiment, the tunnel sections (and the other components of the device) may be configured such that the bulk material stream is surrounded, at least in the field of view of the at least one optical detector, in a plane running perpendicular to the longitudinal axis of at least one of the tunnel sections. In the described embodiment, the plane runs perpendicular to the longitudinal axis by more than 65%, and, preferably more than 75%, of the diffusely reflecting inner side of the tunnel section(s). The longitudinal axes of the tunnel sections run perpendicular to the falling direction of the bulk material stream. At least when the bulk material stream passes through the field of view of the at least one optical detector, the bulk material stream is surrounded predominantly, in particular by more than 65%, by the diffusely reflecting inner sides of the tunnel section perpendicular to the longitudinal axes of the tunnel sections.

Viewed from the bulk material stream, for example, from a pellet, the diffusely reflected interior of one of the tunnel sections is visible more than 65% of the time viewed perpendicular to the rotational axis with a simultaneous rotation about an axis that runs parallel to the longitudinal direction of the tubular section formed by the tunnel sections, and is in poorly or not at all illuminated regions less than 35% of the time. Such regions can in particular be the gap formed between the tunnel sections through which the bulk material stream falls, holders or covers of the lighting means, or an opening in one of the tunnel sections through which the at least one optical detector detects the bulk material stream. By means of the aforementioned embodiment, the indirect illumination of the bulk material stream is further evened out, which further improves the detection of impurities, in particular of transparent bulk material. Of course, the bulk material stream can also be surrounded by more than 65%, preferably by more than 75% by the diffusely reflecting interior of the at least one tunnel section in a region before and after the field of view of the at least one optical detector in a plane lying perpendicular to the longitudinal axis of at least one of the tunnel sections.

These and other embodiments to be described below serve the purpose of compensating for disturbances of ideal illumination that is caused by lateral openings in the tunnel sections, openings in the outer walls of the tunnel sections for the optical detectors and/or the bulk material inlet and bulk material outlet.

The at least one optical detector can be directed toward the bulk material stream to minimize the disturbance of uniform illumination through at least one slotted opening in the outside of the at least one tunnel section. The slotted opening is configured to be to be as small as possible to minimize impairment of the detection data.

As already explained, the tunnel sections can each extend laterally beyond the bulk material stream. On both sides of the bulk material stream, the tunnel sections can in particular each possess a projection beyond the bulk material stream of at least one diameter of the tubular section formed by the tunnel sections. The length of the tubular section formed by the tunnel sections (double tunnel section) is therefore greater than the width of the bulk material stream. The lighting of the bulk material stream thereby further approaches the ideal illumination of an Ulbricht sphere. In particular, disturbances are avoided, or respectively reduced by an illumination intensity that decreases at the tunnel edges. Theoretically, the tunnel sections should project infinitely wide on both sides beyond the bulk material stream in order to ensure optimum illumination from the side as well. Practically, satisfactory lighting can be achieved by a projection on each side of, for example, one to three diameters of the tubular section. Alternatively or in addition, the tunnel sections opposite each other can each be closed on the side by a dome also preferably provided with lighting means for indirectly illuminating the bulk material stream.

According to another embodiment, at least three optical detectors can be provided that are directed toward the bulk material stream through one of the tunnel sections. In this embodiment, at least two optical detectors view the bulk material from the same side and through the same tunnel section. This can yield further improvements in the detection of impurities, in particular with transparent material. In this case, the optical detectors can be directed towards the bulk material stream at an angle of at least 30°. In another embodiment, the optical detector can be directed at an angle of, at least 45° and in another embodiment at an angle of at least 60°. The optical axes, therefore, n lie at an angle of at least 30° relative to each other such that interference is eliminated. Even transparent bulk material refracts light. Because of this, an optical detector cannot reliably detect impurities in the region of the edge of, for example, a pellet. For this, a second optical detector directed toward the bulk material at a different angle can be helpful.

Moreover, at least two optical detectors can be provided that are directed toward the bulk material stream through one of the opposing tunnel sections. The detection regions of the at least two detectors can meet in the center of the tubular section formed by the tunnel sections. In this embodiment, at least two optical detectors view the bulk material stream from opposite sides and through opposing tunnel sections. This embodiment is, in particular, advantageous with non-transparent bulk material since the bulk material stream is reliably detected from both sides. With transparent bulk material, it is contrastingly often sufficient to only detect the bulk material from one side. In order to avoid disturbances, the optical detectors that are directed through the opposing tunnel sections toward the bulk material stream can be directed at an angle relative to each other toward the bulk material stream.

In general when a plurality of optical detectors are present, each of the detectors can be directed through a slot in the respective tunnel section toward the bulk material stream. All of the optical detectors can be cameras as explained above. All of the optical detectors are then connected to the evaluation apparatus, and the evaluation apparatus identifies the impurities in the investigated bulk material with the aid of the measured data from all the optical detectors. It is in principle useful to provide a common evaluation apparatus for all the detectors. This is however not essential. It is, for example, also possible for each detector to be first assigned its own evaluation apparatus that supplies its measured data, or respectively (preliminary) evaluations to a common evaluation apparatus. It is also possible for the evaluation apparatus according to the invention to comprise a plurality of evaluation apparatuses that operate independent of each other. Basically, any combinations of the above-explained embodiments with a plurality of optical detectors are conceivable, for example, two optical detectors can be arranged on one side of the double tunnel arrangement, and one optical detector can be arranged on the opposite side. It would also be conceivable to provide two optical detectors each on both sides of the double tunnel arrangement. With very long tunnel sections, it would also be conceivable to arrange a plurality of optical detectors next to each other on one or both sides of the double tunnel arrangement.

According to another embodiment, a plurality of pairs of tunnel sections that oppose each other as a tube can be provided sequentially in the falling direction of the bulk material stream. Each is arranged such that the bulk material stream falls between the tunnel sections. A lighting means is provided in at least one of the tunnel sections for indirectly illuminating the bulk material stream. Furthermore, at least one optical detector is provided, i.e., directed toward the bulk material stream through at least one of the tunnel sections, to measure the optical data produced by the illuminated bulk material and an evaluation apparatus is provided to identify impurities in the investigated bulk material data. The lighting means of the tunnel sections may be arranged sequentially in the falling direction of the bulk material stream to emit optical radiation in different wavelength ranges.

In the aforementioned embodiments, the plurality of pairs of tunnel sections are arranged sequentially in the falling direction of the bulk material stream, and each form a tubular section. The optical detectors, such as cameras, assigned to the sequentially arranged tubular sections are then correspondingly sensitive to the wavelength range emitted by the lighting means of the respective tunnel section, or respectively tubular section. The lighting means, or respectively the optical detectors can be oriented toward different wavelength ranges or, for example, certain spectral lines in the electromagnetic spectrum. By using a plurality of double tunnel arrangements, different detectors, or respectively lighting means, can be combined in one system. Accordingly, for example, high resolution black/white images can be taken in a double tunnel, color information can be recorded in another tunnel, and UV or IR properties can be recorded in another tunnel. A plurality of detectors of the same type can simultaneous observe the bulk material stream from different directions. In this regard, all of the above-explained embodiments can be used for all of the double tunnel arrangements.

It would in principle also be possible to combine lighting means of different wavelengths in only one tubular section, the radiation of which is recorded by optical detectors sensitive to the respective wavelength ranges. A plurality of lighting means and detectors and hence interfering openings (slots) would then be necessary in one tubular section, however. To avoid this, it can be useful to distribute the detection of different optical properties to a plurality of double tunnel arrangements arranged sequentially in the falling direction of the bulk material stream.

The invention also achieves the object with a method for operating a device according to the invention, wherein the lighting means of different tunnel sections are operated at a different intensity and wavelength, and/or wherein different lighting means of at least one tunnel section are operated at a different intensity.

In particular, lighting means of the tunnel sections opposite each other can be operated at a different intensity, for example, lighting means at the edges of the tunnel sections can also be operated with a stronger intensity than lighting means closer to the center of the tunnel sections in order to avoid a decrease in the illumination at the edges and an associated distortion of the detection result, for example, a stroboscopic illumination of the bulk material stream is also conceivable in order to compensate for any blurs. An individual adaptation to the bulk material to be investigated can be carried out using the method according to the invention.

BRIEF DESCRIPTION OF THE DRAWINGS

Exemplary embodiments of the invention are explained in greater detail below with reference to figures.

FIG. 4 shows a schematic lateral cross-sectional view of the device according to a third exemplary embodiment.

FIG. 5 schematic lateral cross-sectional view of the device according to a fourth exemplary embodiment.

The same reference numbers refer to the same objects in the figures unless indicated otherwise.

DETAILED DESCRIPTION OF THE INVENTION

Figure 1:
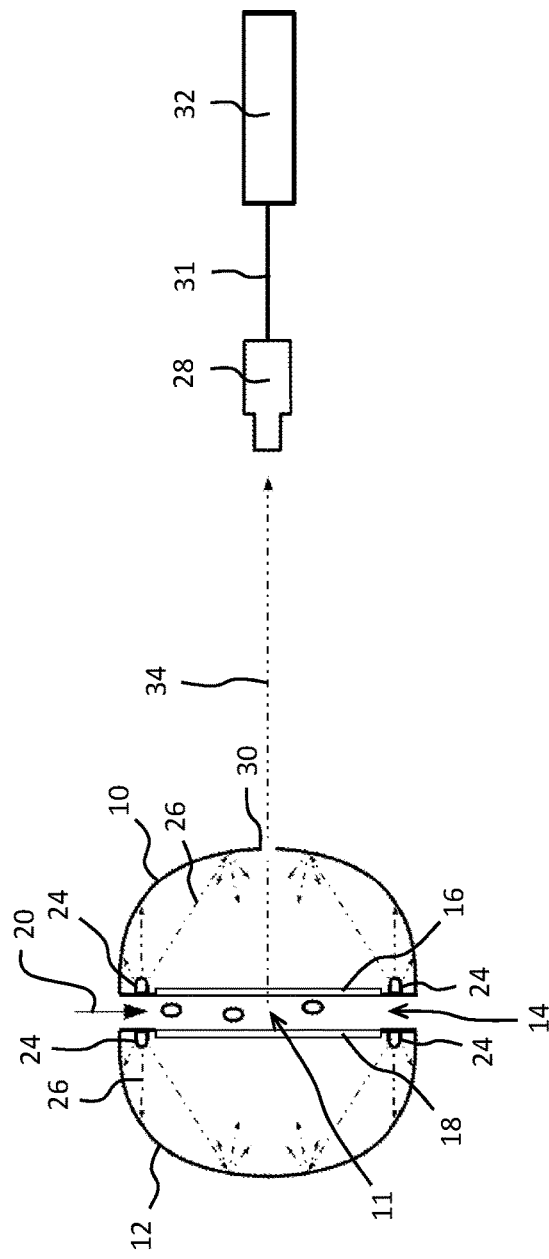
FIG. 1 shows a schematic lateral cross-sectional view of a device according to a first exemplary embodiment.

At reference numbers 10 and 12, FIG. 1 shows two tunnel sections that oppose each other as a tube. The tunnel sections 10, 12 in the present case are designed identical with each other and arranged mirror-symmetrical to each other. Together, they form an approximately cylindrical tube. The tunnel sections 10, 12 are spaced from each other so that a gap 14 is formed between them. The gap 14 is bordered by two opposing discs 16, 18 of the tunnel sections 10, 12 The device supplies bulk material from a vibratory conveyor in a basically flat bulk material stream through a bulk material inlet as illustrated in FIG. 1 by the arrow 20. In the portrayed example, the bulk material inlet is formed by an inlet into the gap 14. In the figures, components of the bulk material stream are shown at reference number 22. The bulk material can, for example, be pellets, in particular plastic pellets. The pellets can be transparent. They can possess a smooth, mirror-reflective surface. The bulk material of the bulk material stream 22 falls under gravity during operation through a gap 14 between the tunnel sections 10, 12 guided on the side only by the disks 16, 18. As can be seen in particular in FIGS. 1 and 2, the falling direction of the bulk material stream 22 lies perpendicular to the longitudinal axis of the tubular section formed by the tunnel sections that runs into the plane of the drawing in FIG. 1.

Figure 2:
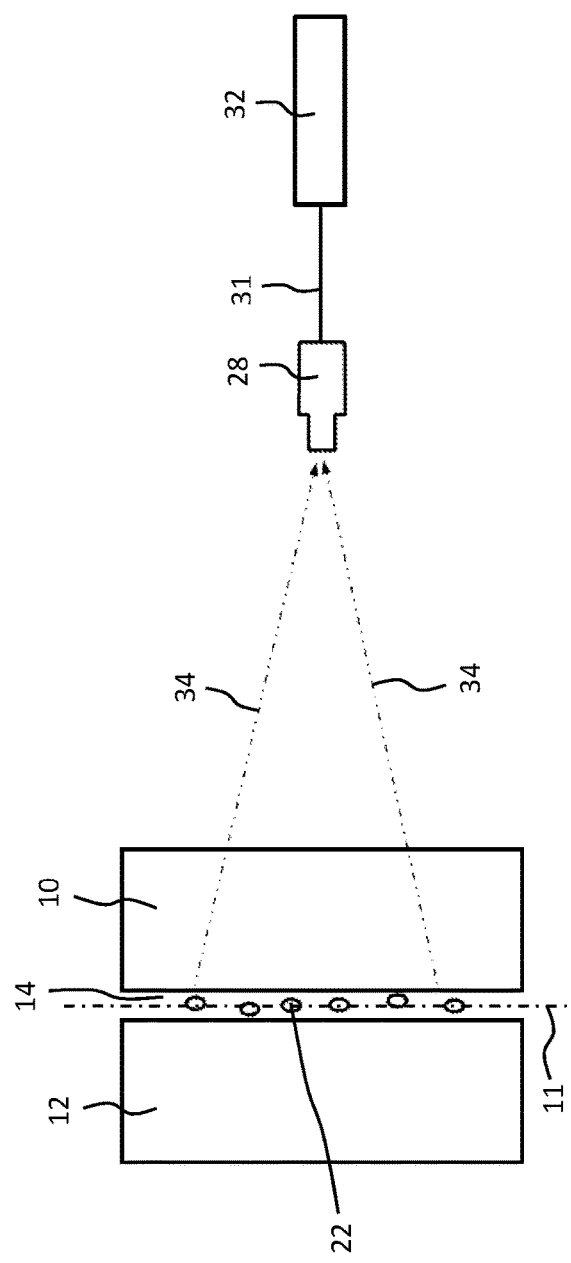
FIG. 2 shows a schematic plan view of the device in FIG. 1.

In the shown example, both tunnel sections 10, 12 comprise lighting means 24 for indirectly illuminating the bulk material stream. The illuminating means 24 can, for example, be light emitting diodes. As illustrated in FIG. 1 by the arrows 26, the lighting means 24 illuminate the curved inner surface of the tunnel sections 10, 12. The optical radiation is reflected diffusely from these inner surfaces and creates an indirect, even/uniform illumination of the bulk material stream 22 from all sides. For this purpose, the lateral extension of the tunnel sections 10, 12 which can be seen in the plan view of FIG. 2, is greater than the width of the bulk material stream 22 so that the tunnel sections 10, 12 possess a lateral projection beyond the bulk material stream 22.

An optical detector 28 such as a camera is directed toward the bulk material stream 22 through a slot 30 in the outer wall of the tunnel section 10 facing the detector 28. The optical detector 28 detects radiation reflected from the bulk material stream 22. The measured data from the optical detector 28 are supplied by a line 31 to an evaluation apparatus 32 that deduces impermissible impurities in the bulk material. The slot 30 extends in the longitudinal direction of the tunnel sections 10, 12 so that the optical detector 28 possesses a measuring range that extends in the longitudinal direction of the tunnel sections 10, 12 as illustrated in FIG. 2 by the arrows 34. Contrastingly, the measuring range perpendicular to this longitudinal direction is not extended, as also illustrated in FIG. 1 by the arrow 34.

In the exemplary embodiment depicted, the bulk material stream 22 is surrounded by more than 65%, of the diffusely reflecting inner surfaces of the tunnel sections 10, 12 in a plane perpendicular to the longitudinal axis 11. The the perpendicular plane is in at least the field of view of the at least one optical detector 28. In another embodiment, the bulk material stream 22 is surrounded by more than 75%, of the diffusely reflecting inner surfaces of the tunnel sections 10, 12 in a plane perpendicular to the longitudinal axis 11.

Figure 3:
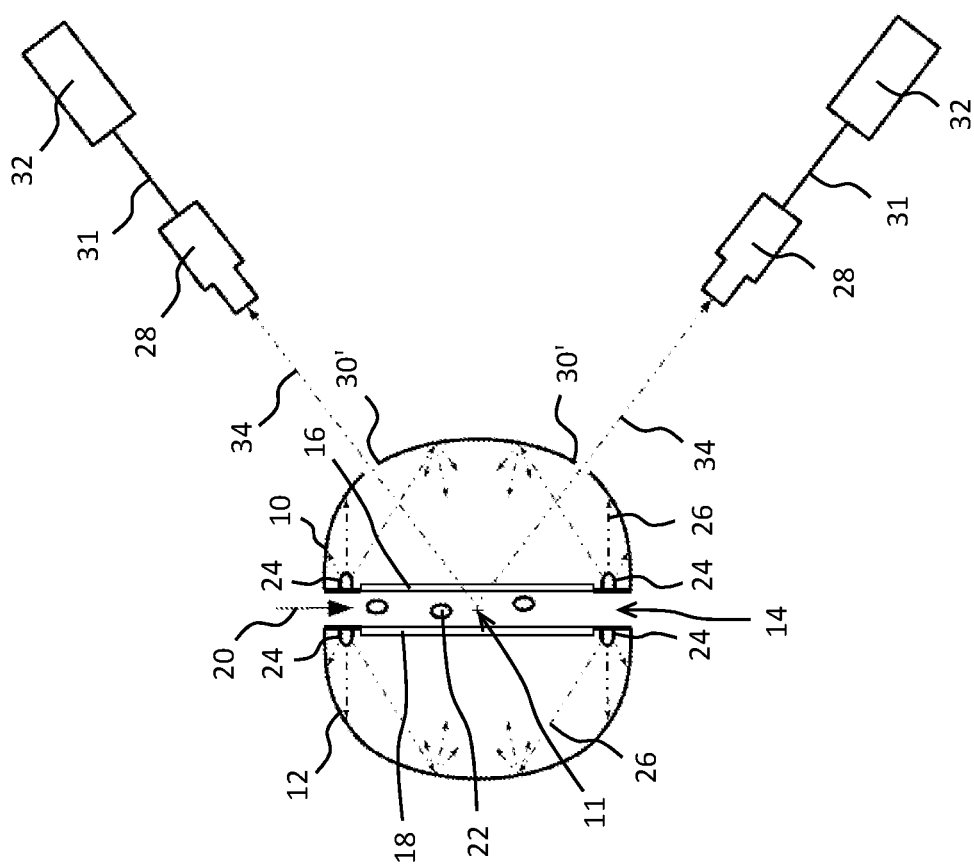
FIG. 3 shows a schematic lateral cross-sectional view of the device according to a second exemplary embodiment.

FIG. 3 shows another exemplary embodiment of a device wherein two optical detectors 28 are provided that detect the bulk material stream 22 flowing through a slot 30' in the outer wall of the tunnel section 10. Each of the optical detectors 28 is, in turn, connected via a line 31 to an evaluation apparatus 32. The evaluation apparatuses 32 in the exemplary embodiment in FIG. 3 can be connected to a common evaluation apparatus (not shown). Of course, instead of two evaluation apparatuses 32, only one evaluation apparatus can be provided to which both optical detectors 28 are directly connected. The two optical detectors 28 are directed toward the bulk material stream 22 at an angle relative to each other. Otherwise, this embodiment, and the detection regions 34 of the optical detectors 28 from FIG. 3, are designed in the same manner as the optical detector 28 in the embodiment depicted in FIGS. 1 and 2. By arranging two optical detectors 28 at an angle as shown in FIG. 3, the probability of detecting impurities in the bulk material stream 22 is further enhanced.

The exemplary embodiment shown in FIG. 4 is largely the same as the exemplary embodiment shown in FIGS. 1 and 2, however, two optical detectors 28 are provided each directed toward the bulk material stream 22 through a slot 30" in the outer walls of the mutually opposing tunnel sections 10, 12, i.e., from opposite sides. The detection regions 34 of the optical detectors 28 meet in the center of the tubular section formed by the tunnel sections 10, 12. Moreover, the optical detectors 28 in FIG. 4 are arranged at an angle relative to each other to avoid mutual interference. The embodiment shown in FIG. 4 in which the bulk material stream 22 is detected from opposite sides is, in particular, suitable for nontransparent bulk material, whereas the embodiments depicted FIGS. 1 to 3, are suitable for transparent bulk material.

Another embodiment is shown in FIG. 5 the optical detectors 28 arranged on opposite sides but not arranged at an angle relative to each other. Rather, the optical detectors 28 each detect the bulk material stream 22 through a slot 30'" which are disposed at a different heights. In this embodiment, the two slots 30'" are offset in height relative to each other in order to avoid mutual interference.

The embodiments shown in FIGS. 1 to 5 can also be combined with each other depending on the bulk material to be detected. In principle, the measuring results for detection can be optimized by selecting the suitable arrangement and alignment of the optical detectors 28.

REFERENCE NUMBER LIST

10 Tunnel section
11 Longitudinal axis

12 Tunnel section
14 Gap
16 Disk
18 Disk
20 Arrow
22 Bulk material stream
24 Lighting means
26 Arrows
28 Optical detector
30 Slot
30' Slot
30" Slot
30'" Slot
31 Line
32 Evaluation apparatus
34 Arrows

The invention claimed is:

1. A device for investigating bulk material for impurities, including a bulk material inlet through which the bulk material is supplied to the device in a substantially flat bulk material stream, the device comprising:
at least two opposing tubular tunnel sections forming a tubular section, the at least two opposing tubular tunnel sections being configured such that the bulk material stream flows through the at least two opposing tunnel sections perpendicular to a longitudinal axis of the tubular section, wherein the tunnel sections are spaced apart from each other to define a gap such that the bulk material stream falls through the gap;
a lighting means disposed in combination with both tunnel sections and only configured to indirectly illuminating the bulk material stream such that optical radiation does not pass directly from the lighting means to the bulk material stream, wherein the lighting means is further configured such that an inner side of at least one of the two opposing tubular tunnel sections is illuminated to diffusely reflect the optical radiation emitted by the lighting means;
an optical detector configured to view the optical radiation from the bulk material stream through at least one of the tunnel sections, such that the optical radiation does not pass directly from the lighting means to the optical detector through the bulk material stream, wherein the optical detector is configured to sense impurities in the bulk material and issue bulk material data indicative thereof; and
an evaluation apparatus responsive to the bulk material data and configured for identifying impurities in the bulk material,
wherein the gap is limited by discs in the tunnel sections that oppose each other and are transparent to light emitted by the lighting means, and
wherein the at least two opposing tunnel sections are configured such that the bulk material stream is in a field of view of the optical detector in a plane perpendicular to a longitudinal axis of the at least one of the two opposing tunnel sections by more than 65% of a diffusely reflecting inner side of the at least one tunnel section.

2. The device according to claim 1, further comprising a conveyor belt configured to supply the bulk material to the bulk material inlet.

3. The device according to claim 1, further comprising a vibrating channel configured to supply the bulk material to the bulk material inlet.

4. The device according to claim 1, wherein the optical detector is directed toward the bulk material stream through at least one slotted opening in an outside of the at least one tunnel section.

5. The device according to claim 4, wherein the bulk material inlet is configured such that the tunnel sections on both sides of the bulk material stream each project beyond the bulk material stream by a dimension equal to at least one diameter of a tubular section formed by the tunnel sections.

6. The device according claim 5, further comprising at least two optical detectors directed toward the bulk material stream through one of the tunnel sections.

7. The device according to claim 6, wherein the at least two optical detectors are directed towards the bulk material stream at an angle of at least 30°.

8. The device according to claim 6 wherein the at least two optical detectors are directed towards the bulk material stream at an angle of at least 45°.

9. The device according to claim 6, wherein the at least two optical detectors are directed toward the bulk material stream through opposing tunnel sections.

10. The device according to claim 9, wherein each of the at least two optical detectors illuminate the bulk material in a detection region, and wherein the detection regions meet in a center of the tubular section formed by the tunnel sections.

11. The device according to one of claim 9, wherein the at least two optical detectors are directed at an angle to each other toward the bulk material stream.

12. The device according claim 11, further comprising plurality of tunnel sections that oppose each other sequentially in the direction of the bulk material stream and configured such that the bulk material stream falls between the tunnel sections, wherein at least one of the tunnel sections includes a lighting means for indirectly illuminating the bulk material stream, wherein at least one optical detector is directed toward the bulk material stream through at least one of the tunnel sections, and wherein the evaluation apparatus in configured to identify impurities in the bulk material by means of measured data from all of the optical detectors.

13. The device according to claim 12, wherein the lighting means of the tunnel sections emit optical radiation in different wavelengths.

14. A method for operating a device for investigating bulk material including the steps of:
causing a flow of bulk material through a gap formed between opposing tubular tunnel sections forming a tubular section, wherein the bulk material flows through the two opposing tubular tunnel sections perpendicular to a longitudinal axis of the tubular section, and the gap is limited by discs in the tunnel sections that oppose each other and are transparent to light emitted by a lighting means;
indirectly illuminating a bulk material stream flowing through opposing tunnel sections by a lighting means disposed in combination with both tunnel sections such that optical radiation does not pass directly from the lighting means to the bulk material stream and such that optical radiation does not pass directly from the lighting means to an optical detector through the bulk material stream, wherein an inner side of at least one of the two opposing tubular tunnel sections is illuminated by the lighting means and diffusely reflects the optical radiation emitted by a lighting means;
varying the optical radiation in different tunnel sections of the opposing tunnel sections, wherein the optical radiation from the bulk material stream is viewed through at least one of the tunnel sections;

sensing impurities in the bulk material using an optical detector, wherein the optical radiation does not pass directly from the lighting means to the optical detector through the bulk material stream;

issuing bulk material data indicative of the sensed impurities; and identifying the impurities in the bulk material, wherein the at least two opposing tunnel sections are configured such that the bulk material stream is in a field of view of the optical detector in a plane perpendicular to a longitudinal axis of the at least one of the two opposing tunnel sections by more than 65% of a diffusely reflecting inner side of the at least one tunnel section.

15. The method of claim 14 wherein the step of varying the optical radiation in different tunnel sections includes the step of varying an intensity of the optical radiation in the different tunnel sections.

16. The method of claim 14 wherein the step of varying the optical radiation in different tunnel sections includes the step of varying a wavelength of the optical radiation in the different tunnel sections.

17. The method of claim 14 wherein the step of varying the optical radiation in different tunnel sections includes the step of varying an angle of incidence of the optical radiation received by the optical detectors from the bulk material stream through each of the tunnel sections.

* * * * *